US012189391B2

(12) United States Patent
Baba et al.

(10) Patent No.: US 12,189,391 B2
(45) Date of Patent: Jan. 7, 2025

(54) CONTROL SYSTEM, MOBILE OBJECT, CONTROL METHOD, AND STORAGE MEDIUM

(71) Applicant: HONDA MOTOR CO., LTD., Tokyo (JP)

(72) Inventors: Ichiro Baba, Wako (JP); Misako Yoshimura, Wako (JP); Yosuke Koike, Wako (JP); Kosuke Nakanishi, Wako (JP); Koki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,058

(22) Filed: Feb. 23, 2022

(65) Prior Publication Data

US 2022/0291689 A1     Sep. 15, 2022

(30) Foreign Application Priority Data

Mar. 11, 2021   (JP) .................................. 2021-039276

(51) Int. Cl.
*G05D 1/00*     (2024.01)

(52) U.S. Cl.
CPC .......... *G05D 1/0212* (2013.01); *G05D 1/0088* (2013.01)

(58) Field of Classification Search
CPC .. G05D 1/0212; G05D 1/0088; G05D 1/0217; G05D 1/0246; G05D 2201/0212; B60W 30/00

(Continued)

(56) References Cited

U.S. PATENT DOCUMENTS 10,248,120 B1 *   4/2019   Siegel .................. G05D 1/0088
10,866,107 B2 *   12/2020  Takashima ......... G01C 21/3484
(Continued)

FOREIGN PATENT DOCUMENTS

JP     2002-297611     10/2002
JP     2003-240591     8/2003
(Continued)

OTHER PUBLICATIONS

Japanese Office Action for Japanese Patent Application No. 2021-039276 mailed Nov. 1, 2022.
(Continued)

*Primary Examiner* — Marc Burgess
*Assistant Examiner* — John D Holman
(74) *Attorney, Agent, or Firm* — Amin, Turocy & Watson, LLP

(57) ABSTRACT

A control system of a mobile object that can move in any one operation mode determined from a plurality of operation modes is provided. The control system includes: a storage device configured to store instructions; and one or more processors, wherein the one or more processors execute the instructions stored in the storage device to: generate evaluation information for a trajectory of the mobile object including a trajectory on a sidewalk; each of the plurality of operation modes being associated with an acceptance level for an event that may occur when the mobile object moves along a trajectory; and generate the evaluation information for the trajectory based on the acceptance level in the operation mode associated with an event that occurs when moving along the trajectory.

6 Claims, 13 Drawing Sheets

(58) Field of Classification Search
USPC .......................................................... 701/25
See application file for complete search history.

(56) References Cited

U.S. PATENT DOCUMENTS

2013/0090802 A1* 4/2013 Curtis .................. G05D 1/0278
701/25
2017/0038775 A1* 2/2017 Park ...................... F02D 41/021
2018/0299281 A1 10/2018 Takashima

FOREIGN PATENT DOCUMENTS

| JP | 2019-197328 | 11/2019 |
| JP | 2019-211255 | 12/2019 |
| JP | 2020-026988 | 2/2020 |
| JP | 2020-166734 | 10/2020 |

OTHER PUBLICATIONS

Japanese Office Action for Japanese Patent Application No. 2021-039276 mailed Apr. 4, 2023. .
Chinese Office Action for Chinese Patent Application No. 202210164537.6 mailed Sep. 11, 2024.

\* cited by examiner

ACCEPTANCE LEVEL: ○ > △ > ×

| ITEM<br>MODE | STEP | TRAVEL ON BOUNDARY BETWEEN SIDEWALK AND ROADWAY | USE MOVEMENT TRAJECTORY OF PEDESTRIAN | HILL | CURVED ROAD | CONGESTION (PEOPLE, CAR) | SLOPE | MANY SIGNALS |
|---|---|---|---|---|---|---|---|---|
| TIME-EMPHASIS MODE | ○ | ○ | × | ○ | ○ | × | ○ | × |
| BALANCED MODE | △ | △ | △ | △ | △ | △ | △ | △ |
| COMFORT MODE | × | × | ○ | × | × | ○ | × | ○ |

| ITEM<br>ROUTE | STEP<br>(×1) | TRAVEL ON BOUNDARY<br>BETWEEN SIDEWALK<br>AND ROADWAY(×1) | ... | DEGREE OF<br>CONGESTION<br>(PEOPLE, CAR)(×0.2) | ... | SCORE |
|---|---|---|---|---|---|---|
| ROUTE 1 | 1 | 1 | ... | 8 | ... | ○○ |
| ROUTE 2 | 5 | 5 | ... | 6 | ... | ×× |
| ROUTE 3 | 10 | 10 | ... | 2 | ... | △△ | ate information for a trajectory of the mobile object including a trajectory on a sidewalk; each of the plurality of operation modes being associated with an acceptance level for an event that may occur when the mobile object moves along a trajectory; and generate the evaluation information for the trajectory based on the acceptance level in the operation mode associated with an event that occurs when moving along the trajectory.

CONTROL SYSTEM, MOBILE OBJECT, CONTROL METHOD, AND STORAGE MEDIUM

CROSS-REFERENCE TO RELATED APPLICATION

This application claims priority to and the benefit from Japanese Patent Application No. 2021-039276, filed on Mar. 11, 2021, the contents of which are hereby incorporated by reference into the present application.

FIELD

The present invention relates to control systems, mobile objects, control methods, and storage media.

DESCRIPTION OF RELATED ART

Conventionally, an electric vehicle travel support device that supports the travel of an electric vehicle has been disclosed (Japanese Unexamined Patent Application, First Publication No. 2019-197328). This electric vehicle travel support device includes an image capturing unit that captures an image of a road surface, a detection unit that determines a direction in which the electric vehicle can move from the captured image data of the image capturing unit, a control information generator that generates control information for controlling the travel of the electric vehicle based on the direction detected by the detection unit, and a travel controller that controls the travel of the electric vehicle based on the control information generated by the control information generator.

SUMMARY

However, with the above-described technology, the electric vehicle may not be able to travel on a route suitable for the user.

With the foregoing in view, one of the objects of the present invention is to provide a control system, a mobile object, a control method, and a storage medium capable of allowing a mobile object to travel on a route suitable for the user.

The control system, mobile object, control method, and storage medium according to the present invention have the following configurations.

(1) A control system according to an aspect of the present invention is a control system of a mobile object that can move in any one operation mode determined from a plurality of operation modes, the control system including: a storage device configured to store instructions; and one or more processors, wherein the one or more processors execute the instructions stored in the storage device to: generate evaluation information for a trajectory of the mobile object including a trajectory on a sidewalk; each of the plurality of operation modes being associated with an acceptance level for an event that may occur when the mobile object moves along a trajectory; and generate the evaluation information for the trajectory based on the acceptance level in the operation mode associated with an event that occurs when moving along the trajectory.

(2) In aspect (1), the one or more processors execute the instructions to: when the mobile object moves, generate the evaluation information for a plurality of trajectories of the mobile object based on the acceptance level associated with a current operation mode of the mobile object.

(3) In aspect (1) or (2), the one or more processors execute the instructions to: determine the trajectory of the mobile object based on the evaluation information.

(4) In any one of aspects (1) to (3), the one or more processors execute the instructions to: generate the evaluation information for the trajectory of the mobile object when a trajectory that passes through a boundary between a sidewalk and a roadway is included as the trajectory of the mobile object.

(5) In any one of aspects (2) to (4), the one or more processors execute the instructions to: recognize a situation around the mobile object and generate the evaluation information for each of the plurality of trajectories of the mobile object when it is determined based on a result of the recognition that an event associated with an acceptance level lower than a predetermined acceptance level in the current operation mode of the mobile object will occur.

(6) In any one of aspects (1) to (4), the plurality of operation modes includes a first mode in which suppression of a physical load applied to an object moving with the mobile object is emphasized.

(7) In aspect (6), the event includes the mobile object passing over a step, and the acceptance level for passing over the step associated with the first mode is set to be lower than the acceptance level for passing over the step associated with the other modes.

(8) In aspect (6) or (7), the event includes the mobile object passing through a boundary between a roadway and a sidewalk, and the acceptance level for passing through the boundary between the roadway and the sidewalk associated with the first mode is set to be lower than the acceptance level for passing through the boundary between the roadway and the sidewalk associated with the other modes.

(9) In any one of aspects (6) to (8), the event includes the mobile object moving along a movement trajectory of a pedestrian, and the acceptance level for moving along the movement trajectory of the pedestrian associated with the first mode is set to be higher than the acceptance level for moving along the movement trajectory of the pedestrian associated with the other modes.

(10) In any one of aspects (6) to (9), the plurality of operation modes includes a mode in which the mobile object arriving at a destination earlier is emphasized.

(11) In any one of aspects (1) to (10), the one or more processors execute the instructions to: generate the evaluation information for the trajectory for each of a plurality of operation modes.

(12) In any one of aspects (1) to (11), the one or more processors execute the instructions to: output information on a trajectory in which the evaluation information generated for each of a plurality of operation modes is evaluated as a predetermined value or higher to an output device for each of the operation modes.

(13) A mobile object equipped with the control system according to any one of aspects (1) to (12).

(14) A control method according to an aspect of the present invention is a control method for controlling a mobile object that can move in any one operation mode determined from a plurality of operation modes, the method causing a computer to execute: generating evaluation information for a trajectory of the mobile object including a trajectory on a sidewalk; each of the plurality of operation modes being associated with an acceptance level for an event that may occur when the mobile object moves along a trajectory; and generating the evaluation information for the trajectory based on the acceptance level in the operation mode associated with an event that occurs when moving along the trajectory.

(15) Instructions stored in a non-transitory computer storage medium according to an aspect of the present invention is instructions for controlling a mobile object that can move in any one operation mode determined from a plurality of operation modes, the instructions causing a computer to execute: generating evaluation information for a trajectory of the mobile object including a trajectory on a sidewalk; each of the plurality of operation modes being associated with an acceptance level for an event that may occur when the mobile object moves along a trajectory; and generating the evaluation information for the trajectory based on the acceptance level in the operation mode associated with an event that occurs when moving along the trajectory.

According to aspects (1) to (15), the control system can allow the mobile object to travel along a route suitable for the user by generating a trajectory corresponding to the travel mode based on the travel mode.

According to aspect (5), the control system can generate a route to the destination according to the travel mode and generate a trajectory for avoiding an unsuitable event according to the surrounding situation when the mobile object travels based on the route. Therefore, it is possible to more suitably generate a route suitable for the user.

According to aspects (6) to (9), the control system can improve the user's satisfaction by generating a trajectory that improves the ride quality of the user or a trajectory in which the load applied to the object is suppressed.

According to aspect (12), the control system provides the user with the information on the generated trajectory, so that the user can recognize the trajectory along which the mobile object travels. The user can, for example, change the traveling trajectory or change the travel mode according to the recognition result.

BRIEF DESCRIPTION OF THE DRAWINGS

FIG. 4 is a diagram showing an example of mode information 192 in which a travel mode and an acceptance level for each of a plurality of events are associated with each other.

DETAILED DESCRIPTION

Hereinafter, a control system, a mobile object, a control method, and a storage medium according to the embodiment of the present invention will be described with reference to the drawings. As used throughout this disclosure, the singular forms "a," "an," and "the" include plural reference unless the context clearly dictates otherwise.

First Embodiment

[Overall Configuration]

Figure 1:
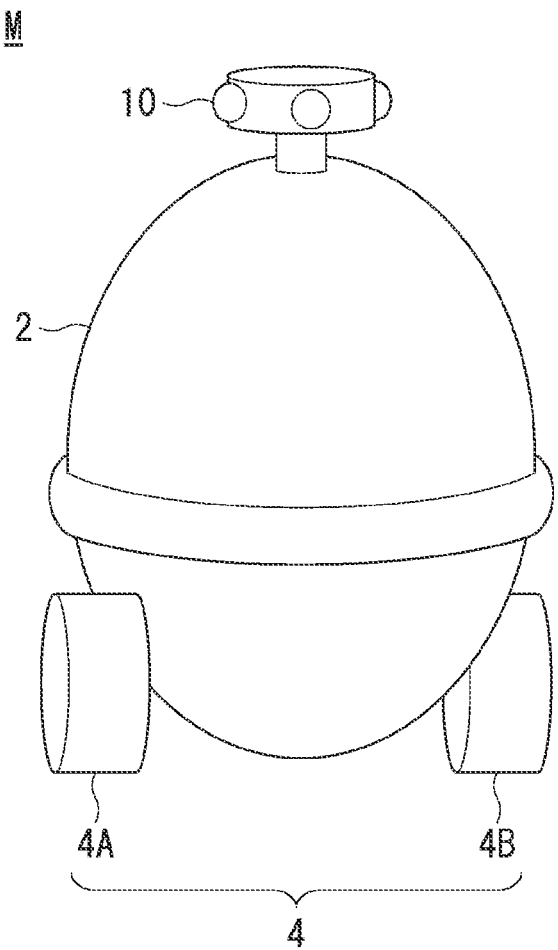
FIG. 1 is a diagram showing an example of a mobile object M including a control device according to an embodiment.

FIG. 1 is a diagram showing an example of a mobile object M including a control device according to an embodiment. The mobile object M is an autonomous mobile robot. The mobile object M supports the users behavior. For example, the mobile object M stops at a position designated by the user, carries the user, and transports the user to the destination. In the present embodiment, the mobile object M is described as moving while carrying the user aboard. However, instead of this (or in addition to this), the mobile object M may transport an article or lead the user to move together with the user and may follow the user to support the users behavior, and the mobile object M may or may not be able to carry the user aboard. In the following description, while the mobile object M is described as traveling, when the mobile object M does not travel but moves by walking or in other modes, the following words "traveling" and "travel mode" may be read "moving" and "moving mode".

The mobile object M includes a main body 2, one or more wheels 4 (4A and 4B in the figure), and a camera 10. The main body 2 is provided with an entrance and exit such as a door (not shown) that allows the user to enter and exit the main body 2, and the user can enter the main body 2 from the entrance and exit and board the mobile object M. For example, the mobile object M drives the wheel 4 based on the image captured by the camera 10 to transport the user.

In the present embodiment, the user is described as boarding in the main body 2. However, instead of this (or in addition to this), the mobile object M may be provided with a seating portion on which the user can be seated without boarding in the main body 2 to move together with the mobile object M, a step on which the user puts his/her foot for movement, and the like. For example, the moving object may be scooter.

Figure 2:
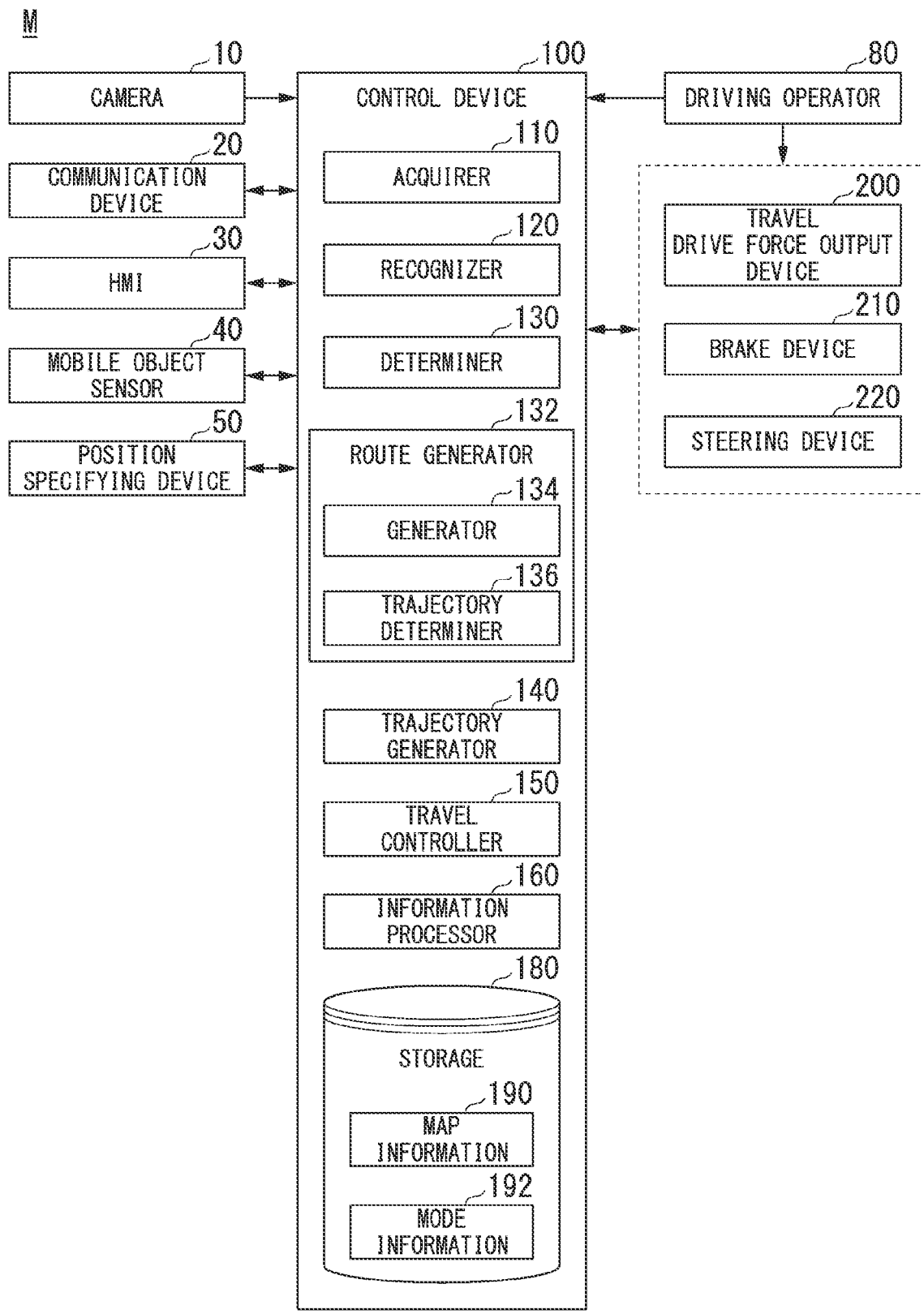
FIG. 2 is a diagram showing an example of another functional configuration included in a mobile object.

FIG. 2 is a diagram showing an example of another functional configuration included in the mobile object M. The mobile object M includes, for example, a camera 10, a communication device 20, an HMI 30, a mobile object sensor 40, a position specifying device 50, a driving operator 80, a control device 100, a travel drive force output device 200, a brake device 210, and a steering device 220.

The camera 10 captures the images around the mobile object M. The camera 10 is, for example, a fisheye camera capable of capturing the images around the mobile object M at a wide angle (for example, at 360 degrees). The camera 10 is attached to the upper part of the mobile object M, for example, and captures the images around the mobile object M at a wide angle in the horizontal direction. The camera 10 may be realized by combining a plurality of cameras (a plurality of cameras that capture a range of 120 degrees or a range of 60 degrees with respect to the horizontal direction). In addition to the camera 10, the mobile object M may include a radar device or LIDAR that detects an object.

The communication device 20 is a communication interface for communicating with other devices using a cellular network, a Wi-Fi network, Bluetooth (registered trademark), a dedicated short-range communication (DSRC), or the like.

The HMI 30 presents various pieces of information to the user of the mobile object M and receives input operations of the user. The HMI 30 includes various display devices, speakers, buzzers, touch panels, switches, keys, and the like.

The mobile object sensor 40 includes a vehicle speed sensor that detects the speed of the mobile object M, an acceleration sensor that detects vertical and lateral accelerations of the mobile object M, a yaw rate sensor that detects the angular speed around the vertical axis, and an azimuth sensor that detects the direction of the mobile object M, and the like.

The position specifying device 50 specifies the position of the mobile object M based on the signal received from a GNSS satellite. The position of the mobile object M may be specified or complemented by an inertial navigation system (INS) using the output of the mobile object sensor 40.

The driving operator 80 includes, for example, an acceleration pedal, a brake pedal, a shift lever, a deformed steering wheel, a joystick, and other operators. Sensors that detect an amount of operation or the presence of an operation are attached to the driving operator 80, and the detection results are output to the control device 100, or any one or all of the travel drive force output device 200, the brake device 210, and the steering device 220. If the mobile object M is controlled only by automated driving, the driving operator 80 may be omitted.

The control device 100 includes, for example, an acquirer 110, a recognizer 120, a determiner 130, a route generator 132, a trajectory generator 140, a travel controller 150, an information processor 160, and a storage 180. The acquirer 110, the recognizer 120, the determiner 130, the route generator 132, the trajectory generator 140, the travel controller 150, and the information processor 160 each are realized when a hardware processor such as a central processing unit (CPU) or the like executes a program (software). Some or all of these components may be realized by hardware (a circuit portion; including circuitry) such as large-scale integration (LSI), an application specific integrated circuit (ASIC), a field-programmable gate array (FPGA), or a graphics processing unit (GPU) and may be realized by the cooperation of software and hardware. The program may be stored in advance in the storage 180 (a storage device including a non-transitory storage medium) such as a HDD or a flash memory and may be stored in a removable storage medium such as a DVD or a CD-ROM and be installed in a HDD or a flash memory when a storage medium (a non-transitory storage medium) is attached to a drive device. Some of the above-mentioned functional units may be included in other devices. One or both of the route generator 132 and the trajectory generator 140 is an example of a "generator". The travel controller 150 is an example of a "controller". Some of the above-mentioned functional units may be mounted on a device different from the control device 100.

The acquirer 110 acquires the image captured by the camera 10. The acquirer 110 acquires the image of a road surface around the mobile object M.

The recognizer 120 recognizes an object or a situation around the mobile object M using, for example, the functions of artificial intelligence (AI) or the functions of a predetermined model, or using them in parallel. For example, the function of "recognizing the area where the mobile object M can travel" may be realized by executing recognition of roads, sidewalks, curbs, and the like by deep learning and recognition based on a predetermined condition (signals which can be subjected to pattern matching) in parallel and scoring both recognition results to make comprehensive evaluation. The recognizer 120 may execute a semantic segmentation process to classify pixels in the frame of an image into classes (for example, an object, a travelable area, a non-travelable area, and the like) and recognize an area in which the mobile object M can travel based on the classification result. As a result, the reliability of the movement of the mobile object M is guaranteed.

The recognizer 120 recognizes the state such as a position, a speed, an acceleration, and the like of an object around the mobile object M based on the image captured by the camera 10. The position of an object is recognized as the position on an absolute coordinate system in which a representative point (the center of gravity, the center of a driving shaft, or the like) of the mobile object M is at the origin, for example, and is used for control. The position of an object may be represented by a representative point such as the center of gravity or a corner of the object and may be represented by an area. The "state" of an object may include the acceleration or a jerk of an object or a "behavior state" (for example, whether the object has changed or is trying to change lanes). The recognizer 120 recognizes, for example, lane marks, road shoulders, curbs, a median strip, guard rails, a temporary stop line, an obstacle, a sign, and other road events. The recognizer 120 recognizes the position and posture of the mobile object M. The recognizer 120 may derive the degree of congestion in a predetermined area using the position of the object obtained from the image. The predetermined area is, for example, an area in which the mobile object M is going to travel. The degree of congestion is the density and number of objects on the road surface. The degree of congestion may be obtained from another device. In this case, the communication device 20 acquires information indicating the degree of congestion from other devices.

The determiner 130 determines the travel mode of the mobile object M to be one of a plurality of travel modes. The route generator 132 generates a route on which the mobile object M travels with reference to map information 190. The route generator 132 includes a generator 134 and a trajectory determiner 136. Details of the processing of the determiner 130 and the route generator 132 will be described later.

The trajectory generator 140 determines one or both of a stop position where the mobile object M stops and a traveling position where the mobile object M travels based on the user's instruction, the area where the mobile object M can travel, and the area where the mobile object M cannot travel. The trajectory generator 140 generates a trajectory based on, for example, a travel mode determined by the determiner 130.

The trajectory generator 140 generates a target trajectory along which the mobile object M travels in the future automatically (regardless of an operation of a driver) so that it is possible to cope with a surrounding situation of the mobile object M. The target trajectory includes a speed element, for example. For example, the target trajectory is represented as an arrangement of positions (trajectory points) that the mobile object M has to reach. The trajectory points are positions that the mobile object M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the mobile object M has to reach at respective sampling time points of the predetermined sampling periods. In this case, the information of the target speed and the target acceleration is represented by the intervals of the trajectory points.

The trajectory generator 140 generates a trajectory along which the mobile object M moves, and calculates the risk of the generated trajectory. The risk is an index value indicating the height of possibility that the mobile object M approaches an obstacle. The risk tends to become higher as the distance from the obstacle to the trajectory (trajectory point of the trajectory) is smaller, and become lower as the distance from the obstacle to the trajectory (trajectory point) is larger.

In the trajectory generator 140, when a total value of the risks and the risk of each trajectory point satisfy predetermined criteria (for example, when the total value is a threshold Th1 or less and the risk of each trajectory point is a threshold Th2 or less), a trajectory that satisfies the criteria is adopted as the trajectory along which the mobile object moves.

The travel controller 150 travels the mobile object M along a trajectory that satisfies predetermined criteria. The travel controller 150 outputs a command value for the mobile object M to travel along the trajectory to the travel drive force output device 200.

The information processor 160 controls various apparatuses and devices included in the mobile object M. The information processor 160 controls, for example, the HMI 30. The information processor 160 acquires voice data input to the microphone and recognizes an operation performed on the operating device.

The travel drive force output device 200 outputs a travel drive force (torque) for the mobile object M to travel to the drive wheels. The travel drive force output device 200 includes, for example, an electric motor, and an electronic controller (ECU) that controls these components. The ECU controls the above-mentioned components according to the information input from the travel controller 150 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the travel controller 150 or the information input from the driving operator 80 so that brake torque corresponding to a braking operation is output to each wheel.

The steering device 220 includes, for example, a steering ECU and an electric motor. The electric motor, for example, applies a force to a rack-and-pinion mechanism to change the direction of a steering wheel. The steering ECU drives an electric motor according to the information input from the travel controller 150 or the information input from the driving operator 80 to change the direction of the steering wheel.

[Overview of Control of Mobile Object]

Figure 3:
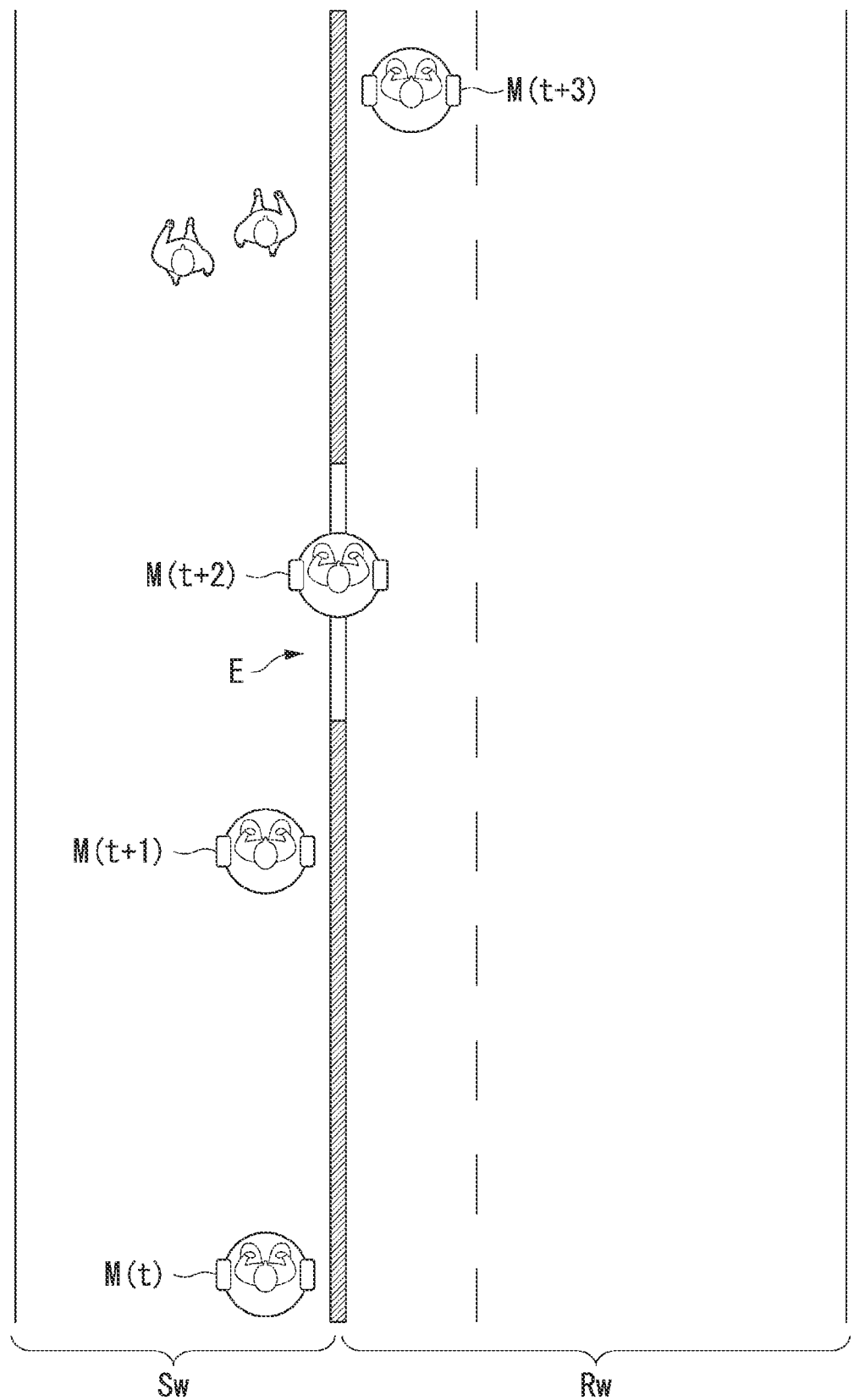
FIG. 3 is a diagram showing an example of the behavior of a mobile object.

FIG. 3 is a diagram showing an example of the behavior of the mobile object M. The mobile object M, for example, carries a user and heads for a destination (waypoint). At this time, the mobile object M travels on the sidewalk Sw (time t, t+1), or descends from the sidewalk Sw to the roadway Rw and travels on the roadway Rw (time t+2, time t+3). The mobile object M, for example, travels on the sidewalk Sw at a speed as high as the walking speed of a pedestrian (for example, 4 km/h or 6 km/h), and, for example, travels on the roadway Rw at a speed higher than the above-mentioned walking speed. In the figure, "E" is the entrance of the roadway (the area where it is possible to enter the sidewalk from the roadway (or enter the roadway from the sidewalk)).

The mobile object M can move in an operation mode determined from a plurality of operation modes. Each of the plurality of operation modes is associated with an acceptance level for an event that may occur when the mobile object M moves along the trajectory. The generator 134 of the route generator 132 generates evaluation information (for example, a score described later) for the trajectory including the trajectory on the sidewalk of the mobile object M. The generator 134 generates evaluation information for the trajectory based on the acceptance level in the operation mode associated with the event that occurs when the mobile object M moves along the trajectory. The generator 134 generates evaluation information for a plurality of trajectories of the mobile object M based on the acceptance level associated with the current operation mode of the mobile object M. For example, the route generator 132 generates evaluation information when the mobile object M moves. The moving time (when the mobile object M moves) includes a time when the mobile object M is moving, a time when the mobile object M is performing movement, such as before starting the movement, or a time when the mobile object M is about to move.

The trajectory determiner 136 determines the trajectory of the mobile object M based on the evaluation information. The trajectory determiner 136 determines the trajectory corresponding to the evaluation information having the highest evaluation among the evaluation information and the trajectory corresponding to the evaluation information having a predetermined degree of evaluation or more as the trajectory along which the mobile object M moves. For example, when the evaluation information of one trajectory generated by the generator 134 satisfies predetermined criteria, the trajectory determiner 136 may determine the trajectory as the trajectory along which the mobile object M moves. The trajectory generator 140 generates a trajectory including the positions of the mobile object M at each time when the mobile object M actually moves based on the determined trajectory.

[Travel Mode]

The determiner 130 determines the travel mode based on the instructions of the user who uses the mobile object M (for example, the user who is on board or the user who is going to board, and the requester of transportation when the mobile object M transports articles). The travel mode includes, for example, a time-emphasis mode, a comfort mode, and a balanced mode. The travel mode may include other modes in addition to the above-described modes.

The "time-emphasis mode" is a mode in which a trajectory is generated so that the mobile object M arrives at the destination at an earlier time, and the mobile object M travels along the generated trajectory. The "comfort mode" is a mode in which a trajectory is generated so that the mobile object M arrives at the destination more comfortably, and the mobile object M travels along the generated trajectory. The "balanced mode" is a travel mode in which the mobile object M arrives at the destination at an early time and the mobile object M arrives at the destination comfortably (The balance mode is mode in which a balance between arriving time and comfortable has is achieved). The control device 100 generates a trajectory according to the set travel mode, and causes the mobile object M to travel along the trajectory. The comfort mode is an example of "a mode in which suppression of the physical load applied to an object moving with a mobile object is emphasized". The comfort mode is a mode in which the comfort of a person or an animal on board (for example, shaking, vibration, and acceleration applied are small) is emphasized when a person or an animal is on board the mobile object M, and the load applied to an article is suppressed (for example, shaking, vibration, and acceleration applied are small) when an article is loaded on the mobile object M. When an article is loaded on the mobile object M, the movement of the mobile object M is controlled so that the article is carried to the delivery destination while being loaded on the mobile object M (without collapsing the load).

Trajectories include long-term trajectories and short-term trajectories. The long-term trajectory is a route from a first point (for example, a starting point) to a second point (a destination or a waypoint), and is a route defined on a map. The short-term trajectory is a trajectory along which the mobile object M moves several [cm] to several [m] or several tens [m], and is a trajectory generated according to the actual conditions of a sidewalk or a roadway. The route generator 132 switches the evaluation function or algorithm used when generating a long-term trajectory for each travel mode. The trajectory generator 140 switches the evaluation function or algorithm used when generating a short-term trajectory for each travel mode.

The plurality of travel modes are defined as having different degrees of acceptance (acceptance levels) for the event. The control device 100 (the route generator 132 and the trajectory generator 140) generates a trajectory based on the acceptance level corresponding to the travel mode. The control device 100 generates a trajectory so as to avoid an event having a low acceptance level in the travel mode.

FIG. 4 is a diagram showing an example of mode information 192 in which a travel mode and an acceptance level for each of a plurality of events are associated with each other. The mode information 192 is stored in the storage 180. The event includes traveling on steps, traveling on the boundary between the sidewalk and the roadway, traveling using the movement trajectory of pedestrians, traveling on hill roads, traveling on curved roads, traveling in congested areas, traveling on slopes, and passing through areas (a route that passes many signals) where mobile objects travels according to signals. Congestion is either sidewalk congestion or roadway congestion. For example, congestion is congestion based on the number and density of people, and congestion based on the number and density of cars and other vehicles.

Figure 5:
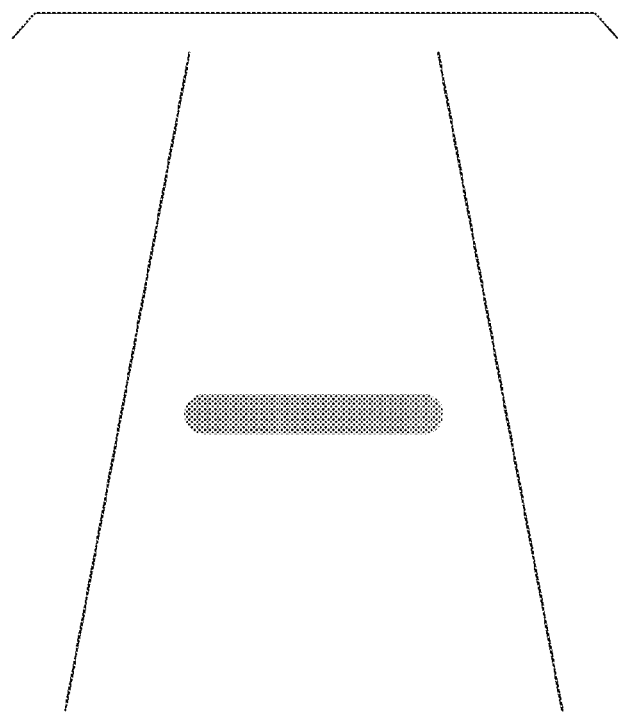
FIG. 5 is a diagram showing an example of a step existing on a road.

The step is, for example, a step at the boundary between the roadway and the sidewalk, a step existing on the road as shown in FIG. 5 (for example, a deceleration zone), and the like. Traveling on the boundary between the sidewalk and the roadway means, for example, that the mobile object M enters the roadway from the sidewalk, or the mobile object M enters the sidewalk from the roadway.

Figure 6:
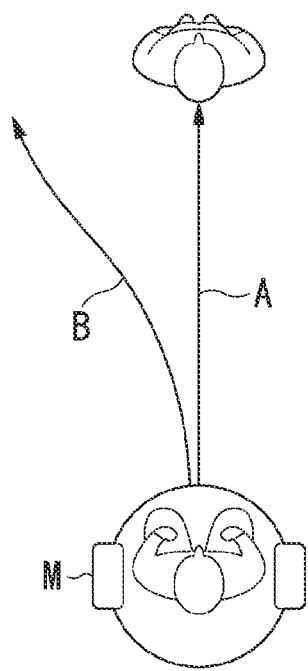
FIG. 6 is a diagram showing an example of a situation in which a mobile object travels along a movement trajectory of a pedestrian so as to follow the pedestrian.

Using the movement trajectory of a pedestrian means, for example, traveling along the movement trajectory of a pedestrian so that the mobile object M follows the pedestrian. For example, it means traveling along the trajectory A shown in FIG. 6. The trajectory B shown in FIG. 6 is a trajectory that the mobile object M does not travel along the movement trajectory of a pedestrian.

Hereinafter, the acceptance level of the event for each travel mode will be described with reference to FIG. 4 described above. The acceptance level is higher in the order of "○", "Δ", and "X". A high acceptance level means that the degree of acceptance level for traveling on the trajectory where the event occurs is higher than that of other travel modes, or that the event is accepted to occur.

The acceptance level for traveling on steps is "○" in time-emphasis mode, "Δ" in balanced mode, and "X" in comfort mode.

The acceptance level for traveling on the boundary between the sidewalk and the roadway is "○" in time-emphasis mode, "Δ" in balanced mode, and "X" in comfort mode.

The acceptance level for traveling using the movement trajectory of a pedestrian is "X" in time-emphasis mode, "Δ" in balanced mode, and "○" in comfort mode.

Acceptance for traveling on hill roads is "○" in time-emphasis mode, "Δ" in balanced mode, and "X" in comfort mode.

The acceptance level for traveling on curved roads is "○" in time-emphasis mode, "Δ" in balanced mode, and "X" in comfort mode.

The acceptance level for traveling in congested areas is "X" in time-emphasis mode, "Δ" in balanced mode, and "○" in comfort mode. This acceptance level may be divided into an acceptance level for traveling on a congested sidewalk and an acceptance level for traveling on a congested roadway.

The acceptance level for traveling on slopes is "○" in time-emphasis mode, "Δ" in balanced mode, and "X" in comfort mode.

The acceptance level for traveling in areas where vehicles travel according to signals is "X" in time-emphasis mode, "Δ" in balanced mode, and "○" in comfort mode.

The time-emphasis mode better allows a trajectory for traveling on steps, a trajectory that switches between sidewalks and roadways, a trajectory for traveling on hill roads, a trajectory for traveling on curved roads, or a trajectory for traveling on slopes than other travel modes. The time-emphasis mode less allows a trajectory for traveling using the movement trajectory of a pedestrian, a trajectory for traveling in a congested area (a trajectory in which congestion is predicted to occur in the future), or a trajectory for traveling in an area in which vehicles travel according to signals than other travel modes. When the time-emphasis mode is set, the occurrence of vertical shaking, lateral shaking, and vertical or lateral acceleration felt by the user riding on the mobile object M is less emphasized than in other modes, and arriving earlier at the destination is emphasized.

The comfort mode less allows a trajectory for traveling on steps, a trajectory for switching between sidewalks and roadways, a trajectory for traveling on hill roads, a trajectory for traveling on curved roads, or a trajectory for traveling on slopes than other modes. The comfort mode more allows a trajectory for traveling using the movement trajectory of a pedestrian, a trajectory for traveling in a congested area (a trajectory in which congestion is predicted to occur in the future), or a trajectory for traveling in an area in which vehicles travels according to signals than other travel modes. When the comfort mode is set, the suppression of the occurrence of vertical shaking, lateral shaking, and vertical or lateral acceleration felt by the user riding on the mobile object M is emphasized and arriving earlier at the destination is less emphasized than in other modes.

When the balanced mode is set, it is a mode in which the balance between the comfort mode and the time-emphasis mode is taken into consideration, and both the suppression of the occurrence of vertical shaking, lateral shaking, vertical or lateral acceleration felt by the user riding on the mobile object M and arriving earlier at the destination are taken into consideration.

[Flowchart (1)]

Figures 7, 8:
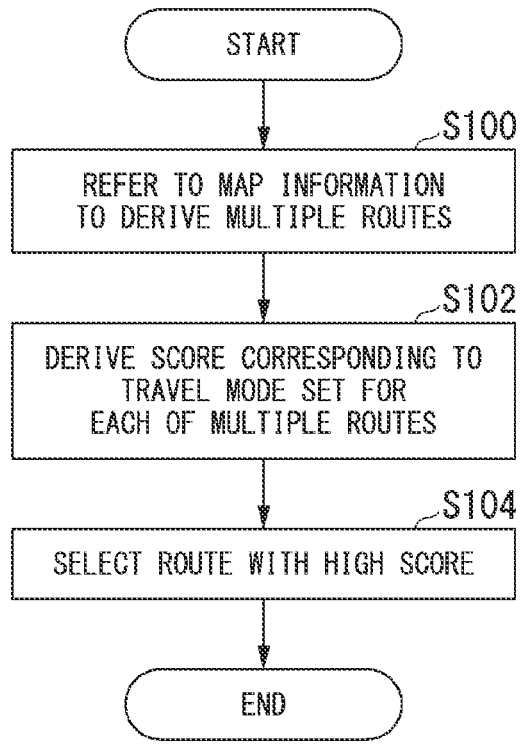
FIG. 7 is a flowchart showing an example of the flow of processing executed by a control device.
FIG. 8 is a diagram showing an example of scores for each of a plurality of routes.

FIG. 7 is a flowchart showing an example of the flow of processing executed by the control device 100. This process is an example of a process related to the generation of a long-term trajectory (an example of a third trajectory). First, the route generator 132 of the control device 100 refers to the map information 190 and derives a plurality of routes (trajectories) to the destination (step S100). A plurality of routes are routes in which the time and distance to reach the destination are within reasonable ranges. Next, the control device 100 derives a score corresponding to the set travel mode for each of the plurality of routes (step S102). Next, the control device 100 selects a route having a high score (step S104). In this way, the processing of one routine of this flowchart ends.

In this process, when a plurality of reasonable routes are generated, a route for traveling only on the roadway or a route for traveling only on the sidewalk is derived (when a trajectory that passes through the boundary between the roadway and the sidewalk is not generated)), the process of step S102 for generating the trajectory along which the mobile object M travels based on the acceptance level corresponding to the travel mode may not be performed. In other words, when the control device 100 generates a trajectory that passes through the boundary between the sidewalk and the roadway, the control device 100 may generate a trajectory along which the mobile object M travels at least on the sidewalk based on the acceptance level corresponding to the determined travel mode. On the other hand, when the control device 100 does not generate a trajectory that passes through the boundary between the sidewalk and the roadway, the control device 100 may not generate a trajectory along which the mobile object M travels at least on the sidewalk based on the acceptance level corresponding to the determined travel mode ("the generator generates the evaluation information for the trajectory of the mobile object when the trajectory of the mobile object includes a trajectory that passes through the boundary between the sidewalk and the roadway"). As described above, when the range of choice of route type is narrow or limited, the processing load is reduced.

FIG. 8 is a diagram showing an example of the score for each of a plurality of routes. For example, it is assumed that the travel mode is set to the comfort mode. In FIG. 8, a score is given to each item, and the higher the score, the more likely it is to avoid the event of that item. As shown in FIG. 8, a high weight is given to an event having a low acceptance level in the travel mode, and a score is derived. For example, the weight for a small number of steps and a small number of switchings between the sidewalk and the roadway is given a higher weight than the degree of congestion. As described above, the score for each trajectory is derived by taking the weight for each event into consideration. Then, the control device 100 selects a trajectory having a high score. In FIG. 8, the route 3 is a route (trajectory) having few steps and few switching between the roadway and the sidewalk, and is a route suitable for the comfort mode.

For example, in the map information 190, links, nodes, and coordinates are associated with various pieces of information such as the presence of a step, whether the road is a sidewalk or a roadway, the gradient or curvature of a road or sidewalk, and the type of road or sidewalk (whether it is a slope), and signal information. The control device 100 acquires congestion information from another device such as a server device that provides the congestion information. The control device 100 refers to various pieces of information and congestion information included in the map information 190 to derive the scores for each trajectory.

As described above, the route generator 132 of the control device 100 can generate a trajectory suitable for the travel mode. As a result, the control device 100 can allow the mobile object M to travel along a route suitable for the user.

[Flowchart (2)]

Figure 9:
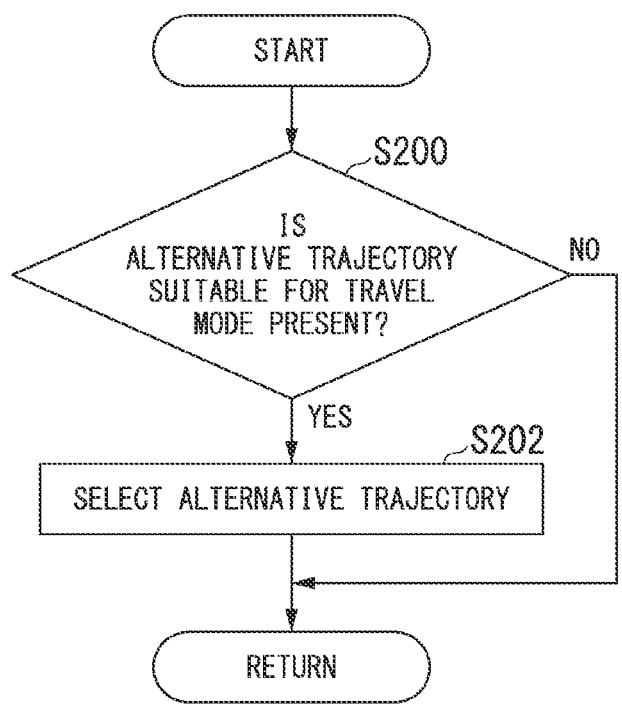
FIG. 9 is a flowchart showing another example of the flow of processing executed by the control device.

FIG. 9 is a flowchart showing another example of the flow of processing executed by the control device 100. This process is an example of a process related to the generation of a short-term trajectory (an example of a fourth trajectory). This process is, for example, a process executed when the mobile object M is traveling on the route (trajectory) generated by the process of the flowchart of FIG. 7.

First, the trajectory generator 140 of the control device 100 determines whether there is an alternative trajectory suitable for the travel mode (step S200). An alternative trajectory suitable for a travel mode is a trajectory that can better realize traveling according to a set travel mode. For example, the alternative trajectory is a trajectory in which user comfort is improved as compared to the preset trajectory when the comfort mode is set, and is a trajectory in which the user can arrive at the destination earlier when the time-emphasis mode is set.

When the alternative trajectory is present, the control device 100 selects the alternative trajectory and allows the mobile object M to travel along the selected alternative trajectory. In this way, the processing of one routine of this flowchart ends.

In the above-described example, it is determined whether there is an alternative trajectory suitable for the travel mode. However, instead of this (or in addition to this), the generator 134 may generate the score (evaluation information) for each of the plurality of trajectories of the mobile object M when the recognizer 120 that recognizes the situation around the mobile object M determines that an event associated with an acceptance level lower than a predetermined acceptance level in the current operation mode of the mobile object M will occur (for example, when an unexpected step is present or an unexpected boundary between roadways and sidewalks is present). Then, the trajectory determiner 136 may determine a trajectory having a high score as a trajectory along which the mobile object M moves.

Figure 10:
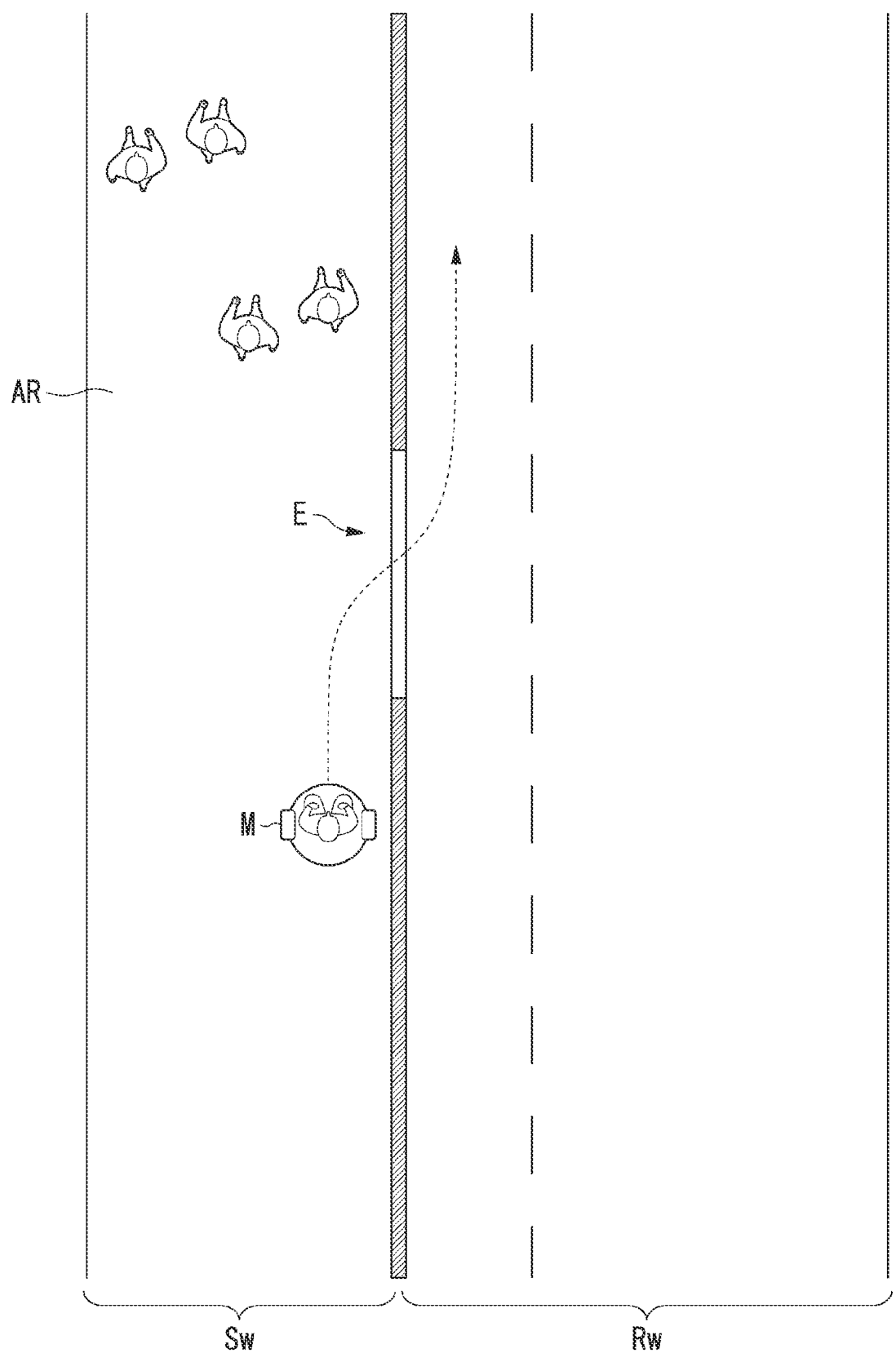
FIG. 10 is a diagram showing an example of a situation in which an alternative trajectory is selected.

FIG. 10 is a diagram showing an example of a situation in which an alternative trajectory is selected. For example, it is assumed that the time-emphasis mode is set and the mobile object M is scheduled to go straight on the sidewalk Sw. In this case, as shown in FIG. 10, if a plurality of pedestrians are present on the sidewalk Sw and the mobile object M goes straight on the sidewalk as it is, the mobile object M will travel at the same speed as the pedestrians. In the above-described situation, when it is determined that an entrance E for entering the roadway Rw is present ahead the mobile object M and the mobile object M can travel at a speed faster than traveling on the sidewalk Sw if the mobile object M travels on the roadway Rw, the trajectory generator 140 generates a trajectory for entering the roadway Rw from the sidewalk Sw and traveling on the roadway Rw. Then, the mobile object M travels on the roadway Rw along the generated trajectory.

As described above, the mobile object M uses the alternative trajectory when it is determined that the alternative trajectory for entering the roadway Rw is suitable for the time-emphasis mode. In other words, the generator 134 generates a plurality of trajectories along which the mobile object M can move and generates the scores for the trajectories when it is determined that an event associated with an acceptance level lower than a predetermined acceptance level in the current operation mode will occur if the mobile object M goes straight. Then, the trajectory determiner 136 determines the trajectory for traveling on the roadway Rw having a high score as the trajectory along which the mobile object M moves. As a result, the control device 100 can allow the mobile object M to travel along a route suitable for the user.

Figure 11:
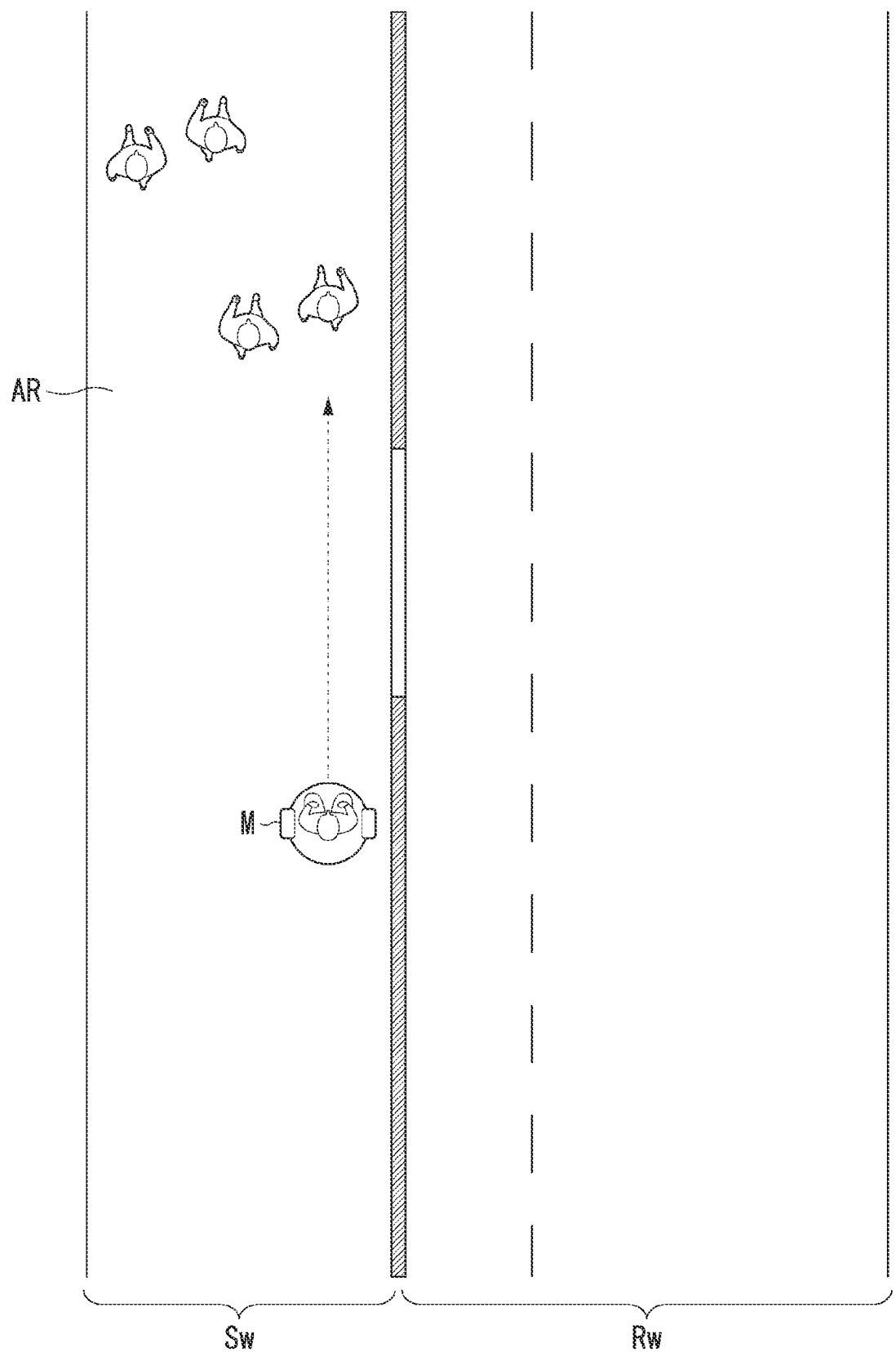
FIG. 11 is a diagram showing an example of a situation in which an alternative trajectory is not selected.

FIG. 11 is a diagram showing an example of a situation in which an alternative trajectory is not selected. The differences from FIG. 10 will be mainly described. For example, it is assumed that the comfort mode is set and the mobile object M is scheduled to go straight on the sidewalk Sw. For example, the mobile object M can enter the roadway Rw from the sidewalk Sw and travel on the roadway Rw. However, the mobile object M determines that the user comfort is higher when traveling along the movement trajectory of the pedestrian than when traveling on the roadway Rw since the behavior of the mobile object M is stable. In this case, the trajectory generator 140 generates a trajectory for traveling behind the pedestrian on the sidewalk Sw without entering the roadway Rw. Then, the mobile object M travels on the sidewalk Sw along the generated trajectory.

As described above, when it is determined that the alternative trajectory for entering the roadway Rw is not suitable for the comfort mode, the mobile object M does not use the alternative trajectory and travels along a predetermined trajectory. In other words, the control device 100 allow the mobile object M to travel on a trajectory suitable for the travel mode based on the score for each trajectory. As a result, the control device 100 can allow the mobile object M to travel along a route suitable for the user.

In the above-described example, the mobile object M has been described as traveling on the sidewalk Sw in advance. However, instead of this (or in addition to this), when a rough traveling area (a route for traveling on either a sidewalk or a roadway) is determined in advance, and the mobile object M arrives near the traveling area, a trajectory corresponding to the travel mode may be generated. For example, if a traveling area is roughly generated in advance by the route generator 132 and a specific trajectory such as traveling on a sidewalk or traveling on a roadway is not generated, the trajectory generator 140 generates the scores for a plurality of trajectories based on the surrounding situation to generate a trajectory suitable for the travel mode using the score instead of performing the process of selecting an alternative trajectory.

Figure 12:
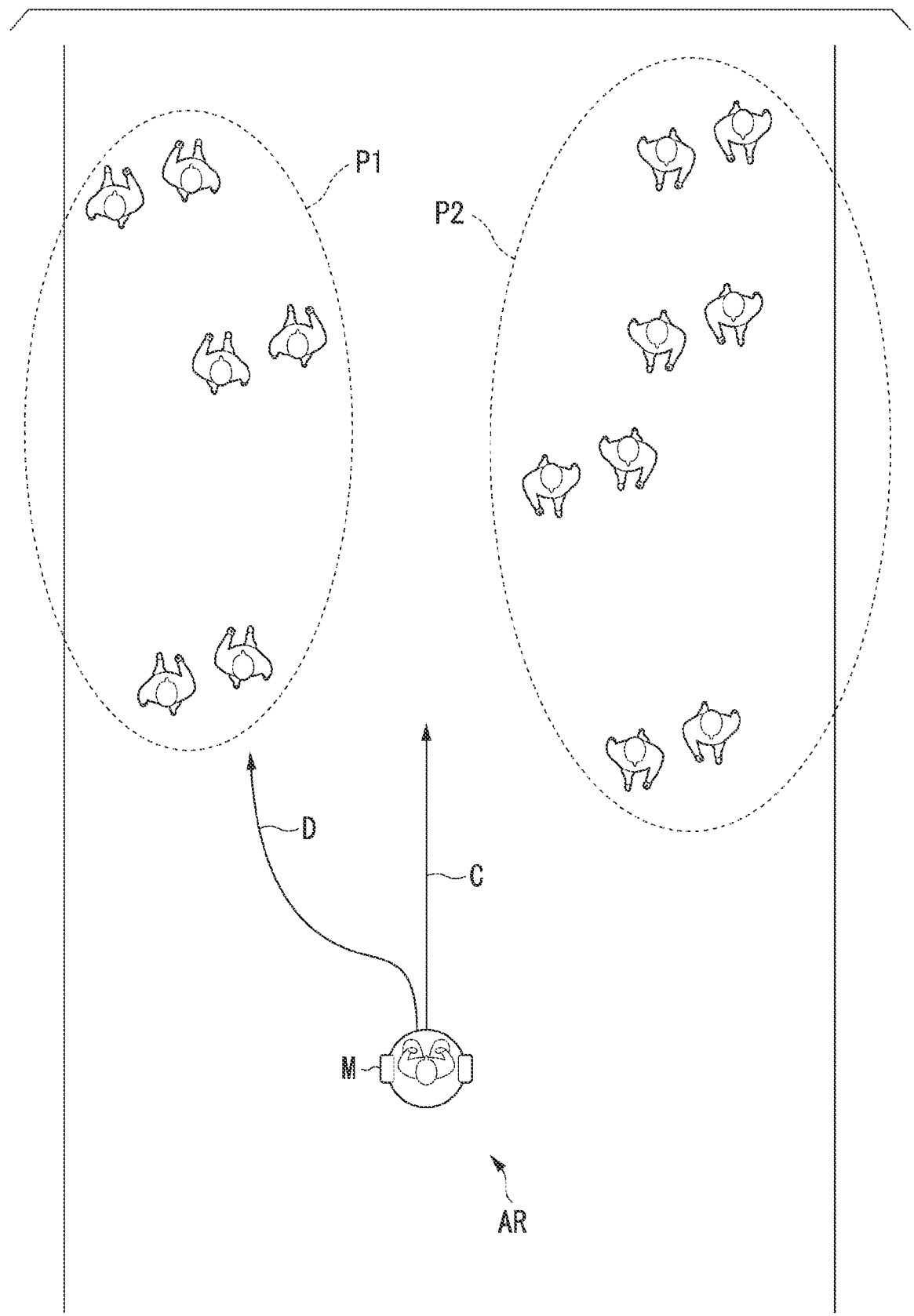
FIG. 12 is a diagram for explaining determination of a trajectory along which the mobile object M travels.

FIG. 12 is a diagram for explaining the determination of the trajectory along which the mobile object M travels. For example, it is assumed that a trajectory that passes through the area AR has been generated in advance. In the area AR, it is assumed that a first group of pedestrians P1 traveling in a first direction is present on the left side, and a second group of pedestrians P2 traveling in a second direction opposite to the first direction is present on the right side. It is assumed that there is a predetermined area between the first pedestrian group P1 and the second pedestrian group P2, through which the mobile object M can pass.

For example, when the time-emphasis mode is set, the trajectory generator 140 generates a trajectory (C in the figure) that passes through the predetermined area having a higher score than other trajectories so that the mobile object M heads for the destination more quickly. For example, when the comfort mode is set, the trajectory generator 140 generates a trajectory (D in the figure) that does not pass through the predetermined area and is based on, for example, the movement trajectory of the first pedestrian group P1 having a higher score than other trajectories so that the mobile object M passes through the area AR so as to follow the first pedestrian group P1.

For example, when the mobile object M passes through a predetermined area, a pedestrian heading in the first direction or the second direction may enter the predetermined area, so that the mobile object M is predicted to accelerate or decelerate. For this reason, there is a possibility that the user comfort may be reduced, but since the mobile object M can pass the first pedestrian group P1, it is possible to quickly head to the destination. On the other hand, when the mobile object M follows the pedestrian group P1, the speed of the mobile object M is the same as that of the pedestrian group P1, but it is predicted that the degree of acceleration or deceleration becomes smaller than that when passing through the predetermined area. Therefore, user comfort is improved.

As described above, the control device 100 can allow the mobile object M to travel along the trajectory suitable for the user by generating a trajectory more suitable for the set travel mode in consideration of the surrounding situation in real time.

According to the first embodiment described above, the control device 100 can generate a route suitable for the user based on the acceptance level of an event corresponding to the (determined (set) travel mode, and allow the mobile object M to travel along the suitable route.

Second Embodiment

Hereinafter, a second embodiment will be described. In the first embodiment, it has been described that the trajectory corresponding to the travel mode is generated. However, in the second embodiment, the information on the travel mode corresponding to a trajectory is provided to the user. Hereinafter, the differences from the first embodiment will be mainly described.

Figure 13:
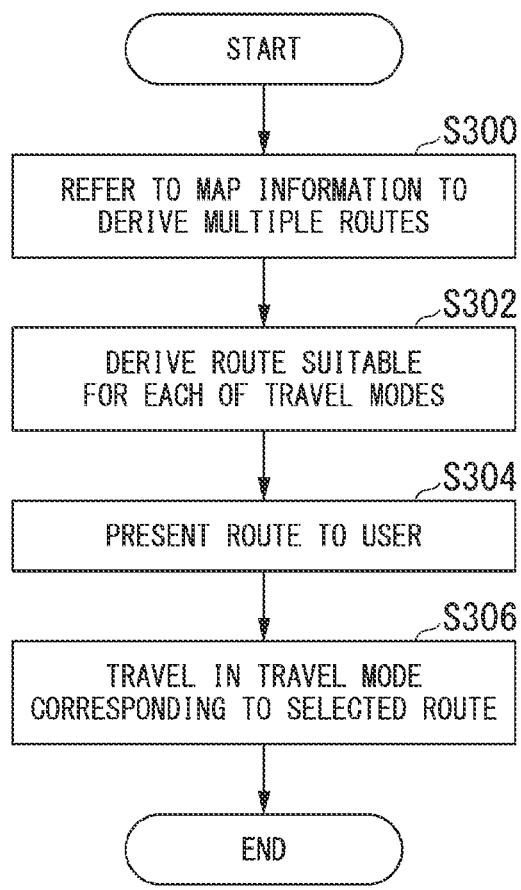
FIG. 13 is a flowchart showing an example of the flow of processing executed by a control device according to a second embodiment.

FIG. 13 is a flowchart showing an example of the flow of processing executed by the control device 100 of the second embodiment. First, the control device 100 refers to the map information 190 and derives a plurality of routes (step S300). Next, the control device 100 derives a route suitable for each travel mode based on the acceptance level of an event in the travel mode and the presence degree (or occurrence degree) of the event in the plurality of routes (step S302). For example, the control device 100 derives a score based on the acceptance level associated with the time-emphasis mode for a plurality of routes, and determines a route having the higher score among the derived scores as a route suitable for the time-emphasis mode. The control device 100 derives a suitable route for the corresponding travel mode with respect to the comfort mode and the balanced mode as described above. That is, the control device 100 (the route generator 132) generates evaluation information (score) for each of a plurality of operation modes.

Next, the information processor 160 of the control device 100 presents a suitable route to the user (step S304). For example, the information processor 160 of the control device 100 presents the user with the routes suitable for the time-emphasis mode, the comfort mode, and the balanced mode. That is, the information processor 160 (the output device) outputs information on the trajectory in which the evaluation information generated for each of the plurality of operation modes is evaluated to be a predetermined value or higher for each operation mode. Next, the control device 100 sets a travel mode corresponding to the route selected by the user, and allows the mobile object M to start traveling in the set travel mode (step S306). In this way, the processing of one routine of this flowchart ends.

Figure 14:
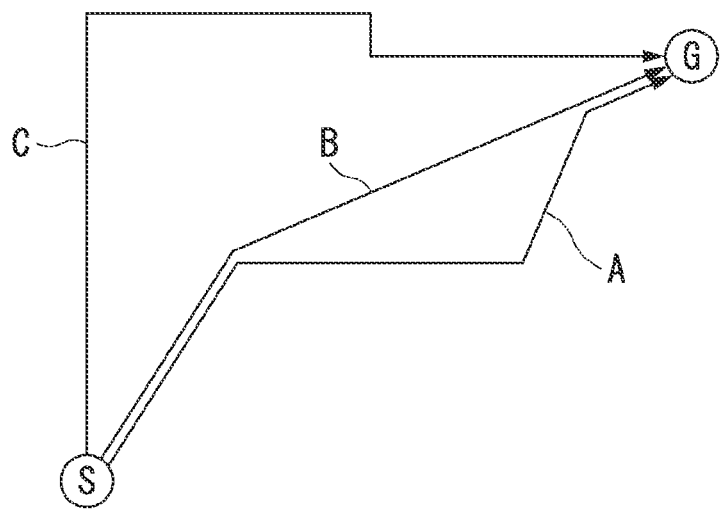
FIG. 14 is a diagram showing an example of information presented to a user.

FIG. 14 is a diagram showing an example of information presented to the user. For example, the display of the HMI 30 displays a route, an estimated time of arrival, a travel mode set in the route, information indicating the characteristics of the route, and information in which the route and the map information are associated. For example, the route A is a route in which an estimated time of arrival is 12:00 and vehicles travel in the time-emphasis mode. The route A is, for example, a route in which vehicles travel on a roadway and a sidewalk, and travel on portions with steps. For example, the route B is a route in which an estimated time of arrival is 12:15 and vehicles travel in the balanced mode. On the route B, for example, vehicles travel on sidewalks more than on roadways. The route C is a route in which an estimated time of arrival is 12:30 and vehicles travel in comfort mode. The route C is, for example, a route in which vehicles travel on sidewalks (for example, vehicles do not travel on roadways).

The user can select a suitable route or travel mode with reference to the information shown in FIG. 14. Then, the mobile object M travels toward the destination along the selected route and in the travel mode corresponding to the route.

The process of the second embodiment (process of determining the travel mode according to the selected route) may be performed instead of the process of the first embodiment (process in which the travel mode is selected and then a route is set after the route is generated) and the process may be performed selectively with or in addition to the process of the first embodiment. Also in the first embodiment, the information as shown in FIG. 14 may be provided to the user. For example, the estimated time of arrival at the destination in the selected travel mode, the characteristics of the route, the estimated time of arrival when heading to the destination in another mode, and the characteristics of the route may be presented to the user. When the user selects another travel mode or a route corresponding to another travel mode, the mobile object M heads for the destination in the selected travel mode and route.

When the user feels that the route corresponding to the initially selected travel mode is not preferable, the user instructs the control device 100 to present the route corresponding to a travel mode different from the selected travel mode. The control device 100 provides the user with the route corresponding to a different travel mode and information on the route based on the above-described instructions. As a result, the user can compare a plurality of routes and select a suitable route and a suitable travel mode.

According to the second embodiment described above, the control device 100 generates a trajectory suitable for each of a plurality of travel modes, and provides the user with information on the generated trajectory. In this way, the user convenience is improved.

Third Embodiment

Hereinafter, a third embodiment will be described. In the first embodiment and the second embodiment, the control device 100 has been described as generating a long-term trajectory. However, in the third embodiment, a route generation device different from the control device 100 generates a long-term trajectory. Hereinafter, the differences of the third embodiment from those of the first and second embodiments will be mainly described.

Figure 15:
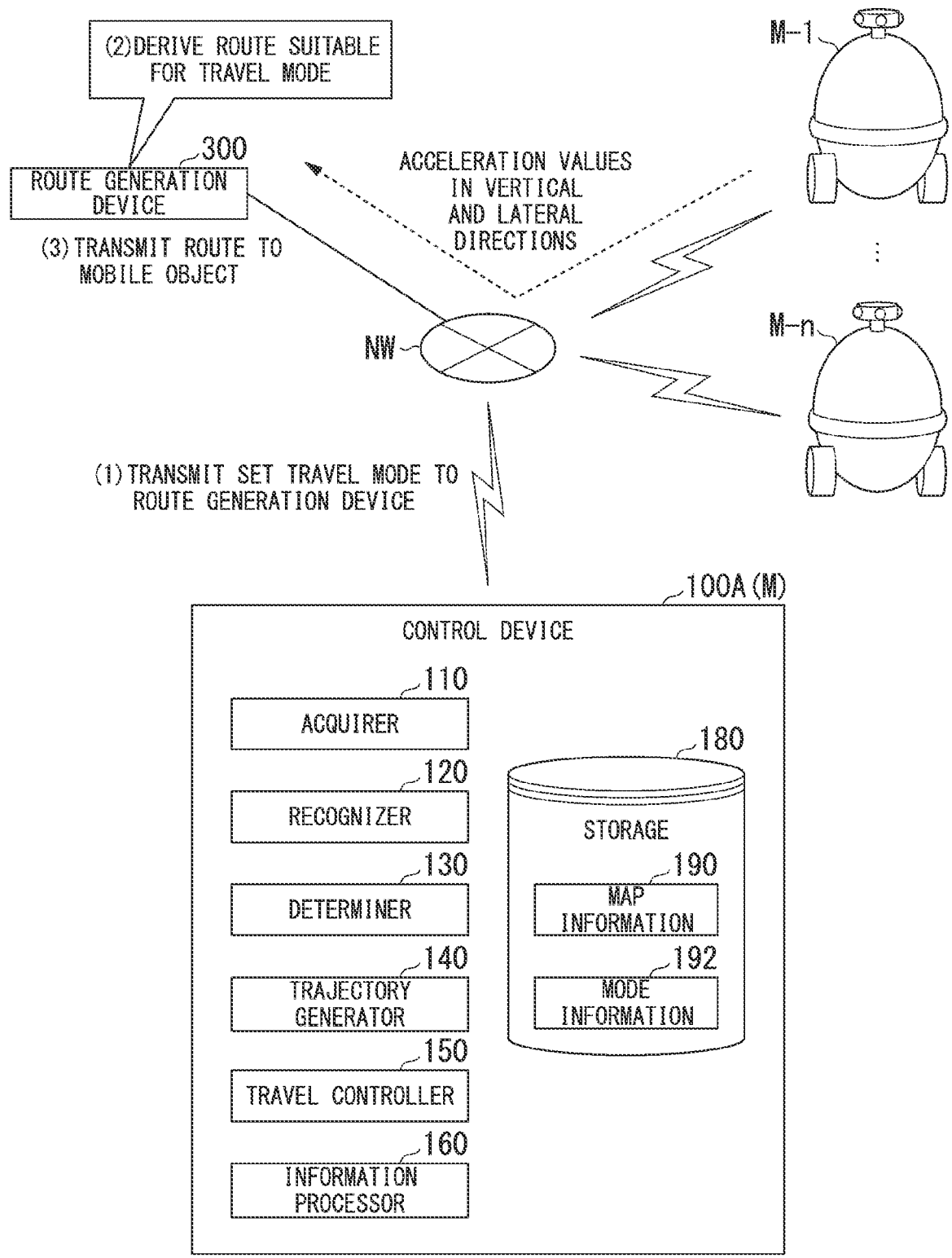
FIG. 15 is a diagram showing an example of a functional configuration of a control system including the mobile object M according to a third embodiment.

FIG. 15 is a diagram showing an example of the functional configuration of the control system 1 including the mobile object M of the third embodiment. The control system 1 includes the mobile object M, mobile objects M-1 to M-n ("n" is an arbitrary natural number) different from the mobile object M, and a route generation device 300. Hereinafter, when the mobile objects M-1 to M-n are not distinguished, they will be referred to as "the other mobile objects". The mobile object M, the other mobile objects, and the route generation device 300 communicate with each other via, for example, a network NW. The network NW includes, for example, the Internet, a wide area network (WAN), a local area network (LAN), a telephone line, a public line, a dedicated line, a provider device, a radio base station, and the like.

In a control device 100A of the mobile object M, for example, the route generator 132 is omitted. The route generation device 300 has, for example, a functional configuration similar to that of the route generator 132. The route generation device 300, for example, refers to map information to derive a route (long-term trajectory) suitable for the travel mode.

The control system 1 performs the following processing. (1) The control device 100A of the mobile object M transmits information indicating the set travel mode to the route generation device 300. (2) The route generation device 300 acquires the information indicating the travel mode transmitted from the control device 100A, and derives a route suitable for the acquired travel mode. (3) The route generation device 300 transmits the derived route to the mobile object M. The mobile object M travels based on the route acquired from the route generation device 300.

The route generation device 300 may acquire acceleration information indicating acceleration in the vertical, lateral, or front-rear directions when traveling along a predetermined route, a traveling speed, and the like from the other mobile objects, and derive a route to be provided to the mobile object M by referring to the acquired information. For example, when the route generation device 300 generates a route in which the fluctuation of each acceleration is relatively small when generating a route in the comfort mode and generates a route in which the fluctuation of each acceleration is not relatively small but the mobile object can quickly pass through when generating a route in the time-emphasis mode. In this way, the route generation device 300 can acquire information for estimating the comfort in the route that the other mobile objects (or the mobile object M) have passed in the past, the smoothness of passage, and the like, and derive a route suitable for the travel mode by referring to the acquired information.

The route generation device 300 may generate routes suitable for a plurality of travel modes in response to a request from the mobile object M, and provide the generated routes to the mobile object M. For example, the mobile object M is provided with routes suitable for a time-emphasis mode, a balanced mode, and a comfort mode. The route generation device 300 may receive a route generation request from a user's terminal device (not shown) and provide the generated routes to the user's terminal device. In this case, the terminal device of the user and the mobile object M communicate with each other, and the mobile object M acquires the route selected by the user and travels along the acquired route.

According to the third embodiment described above, the control system 1 can generate a route suitable for the user based on the acceptance level of the event corresponding to the travel mode, and allow the mobile object M to travel along the suitable route.

The embodiments described above can be expressed as follows.

A control device including: a storage device that stores a program; and a hardware processor, wherein the hardware processor executes the program stored in the storage device to execute: controlling a mobile object that can move in any one operation mode determined from a plurality of operation modes; generating evaluation information for a trajectory of the mobile object including a trajectory on a sidewalk; associating each of the plurality of operation modes with an acceptance level for an event that may occur when the mobile object moves along a trajectory; and generating the evaluation information for the trajectory based on the acceptance level in the operation mode associated with an event that occurs when moving along the trajectory.

While modes for carrying out the present invention have been described using embodiments, the present invention is not limited to these embodiments, and various changes and substitutions can be made without departing from the spirit of the present invention.

What is claimed is:

1. A control system of a mobile object that can move in any one operation mode determined from a plurality of operation modes, the control system comprising:
   a storage device configured to store instructions; and
   one or more processors,
   wherein the one or more processors execute the instructions stored in the storage device to:
   generate evaluation information for a trajectory of the mobile object including a sub-trajectory operable on a sidewalk;
   each of the plurality of operation modes being associated with an acceptance level for an event that occurs when the mobile object moves along the trajectory;
   generate the evaluation information for the trajectory based on the acceptance level in the operation mode associated with the event that occurs when moving along the trajectory;
   generate a plurality of trajectories to a destination;
   determine, for each of the plurality of trajectories, a number of times, representing a determined number, that the mobile object passes a step at a boundary between a roadway and the sidewalk based on a first assumption that the mobile object will travel on each of the plurality of trajectories;
   select a first trajectory and a second trajectory from among the plurality of trajectories based on the determined number of times, a first acceptance level associated with the determined number of times the mobile object is in a first mode of the plurality of operation modes, a second acceptance level associated with the determined number of times the mobile object is in a second mode of the plurality of operation modes,
   a first estimated time at which the mobile object is expected to arrive at the destination based on a second assumption that the mobile object travels according to the second trajectory and arrives at the destination earlier than a second estimated time in which the mobile object is expected to arrive at the destination based on a second assumption that the mobile object travels according to the first trajectory,
   a score corresponding to a set travel mode for each of a plurality of routes,
   the mobile object traveling on the sidewalk and the roadway, and traveling according to the first mode or the second mode,
   the first mode suppressing passing of the mobile object through a step of at the boundary between the sidewalk and the roadway compared with the second mode and causing the mobile object to travel to the destination according to the first trajectory, and
   the second mode causing the mobile object to travel to the destination without suppressing passing of the mobile object through the step at the boundary between the sidewalk and the roadway compared with the first mode according to the second trajectory and,
   wherein the one or more processors execute the instructions stored in the storage device to:
   control the mobile object according to the first mode and cause the mobile object to travel to the destination when a user of the mobile object sets the first mode, and
   control the mobile object according to the second mode and cause the mobile object to travel to the destination when the user of the mobile object sets the second mode.

2. The control system according to claim 1, wherein the one or more processors execute the instructions to:
   generate the first trajectory that causes the mobile object to travel to the destination according to the first mode and the second trajectory that causes the mobile object to travel to the destination according to the second mode,
   the first trajectory is a trajectory in which the determined number of times the mobile object passes through the step at the boundary is equal to or less than a threshold, and
   the second trajectory is a trajectory in which the determined number of times the mobile object passes through the step at the boundary is more than the threshold.

3. The control system according to claim 1, wherein the one or more processors execute the instructions to:
   cause the mobile object to travel on the roadway next to the sidewalk when a condition is satisfied in a case that the mobile object is scheduled to go straight on the sidewalk and the pedestrian is front of the mobile object,
   cause the mobile object to travel behind of the pedestrian on the sidewalk when the condition is not satisfied in a case that the mobile object is scheduled to go straight on the sidewalk and the pedestrian is front of the mobile object,
   the condition is that a first speed is faster than a second speed,
   the first speed is speed in which the mobile object travels when it is assumed that the mobile object travels the roadway next to the sidewalk, and
   the second speed is speed in which the mobile object travels when it is assumed that the mobile object travels behind of the pedestrian on the sidewalk at a speed that the pedestrian walks on the sidewalk.

4. The control system according to claim 1, wherein the one or more processors execute the instructions to:
   set a trajectory that the determined number of times that the mobile object passes a step at the boundary between a roadway and the sidewalk is satisfied with the acceptance level associated with the first mode among the plurality of trajectory as the first trajectory, and set a trajectory that the determined number of times that the mobile object passes a step at the boundary between a roadway and the sidewalk is satisfied with the acceptance level associated with the second mode and is not satisfied with the acceptance level associated with the first mode among the plurality of trajectory as the second trajectory.

5. A control system of a mobile object that can move in any one operation mode determined from a plurality of operation modes, the control system comprising:

a storage device configured to store instructions; and
one or more processors,
wherein the one or more processors execute the instructions stored in the storage device to:
generate evaluation information for a trajectory of the mobile object including a sub-trajectory operable on a sidewalk;
each of the plurality of operation modes being associated with an acceptance level for an event that occurs when the mobile object moves along the trajectory;
generate the evaluation information for the trajectory based on the acceptance level in the operation mode associated with the event that occurs when moving along the trajectory;
generate a plurality of trajectories to a destination;
determine a number of times, representing a determined number, that the mobile object passes a step at a boundary between a roadway and the sidewalk based on a first assumption that the mobile object will travel on each of the plurality of trajectories;
select a first trajectory and a second trajectory from among the plurality of trajectories based on the determined number of, a first acceptance level associated with the determined number of times the mobile object is in a first mode of the plurality of operation modes, a second acceptance level associated with the determined number of times the mobile object is in a second mode of the plurality of operation modes,
a first estimated time at which the mobile object is expected to arrive at the destination based on a second assumption that the mobile object travels according to the second trajectory and arrives at the destination earlier than a second estimated time in which the mobile object is expected to arrive at the destination based on a second assumption that the mobile object travels according to the first trajectory,
a score corresponding to a set travel mode for each of a plurality of routes,
the mobile object traveling on the sidewalk and the roadway, and traveling according to a first mode or a second mode,
identify the first trajectory in which the mobile object travels according to the first mode and the second trajectory in which the mobile object travels according to the second mode,
the first trajectory being a trajectory in which the number of times the mobile object plans to pass through the step of at the boundary until the mobile object reaches the destination is few compared with the second trajectory, and
the second trajectory being a trajectory in which the number of that the mobile object plans to pass through the step at the boundary until the mobile object reaches the destination is large compared with the first trajectory, and
display a content on a display of a user device, the content includes information of the first trajectory and information of the second trajectory.

6. The control system according to claim 5, wherein
the first trajectory is a trajectory in which the determined number of times the mobile objects plans to pass through the step at the boundary until the mobile object reaches the destination is equal to or less than a threshold,
the second trajectory is a trajectory in which the number of times the mobile object plans to pass through the step at the boundary until the mobile object reaches the destination is more than the threshold.

* * * * *